United States Patent
Zhang

(10) Patent No.: US 9,545,665 B2
(45) Date of Patent: Jan. 17, 2017

(54) METHOD OF REPAIRING DEFECTS IN CAST IRON WORKPIECES, AND A METHOD OF CONNECTING CAST IRON WORKPIECES

(75) Inventor: Hong Wei Zhang, Beijing (CN)

(73) Assignee: Vestas Wind Systems A/S, Aarhus N. (DK)

( * ) Notice: Subject to any disclaimer, the term of this patent is extended or adjusted under 35 U.S.C. 154(b) by 108 days.

(21) Appl. No.: 14/365,795

(22) PCT Filed: Dec. 15, 2011
(Under 37 CFR 1.47)

(86) PCT No.: PCT/CN2011/084063
§ 371 (c)(1),
(2), (4) Date: Mar. 4, 2015

(87) PCT Pub. No.: WO2013/086721
PCT Pub. Date: Jun. 20, 2013

(65) Prior Publication Data
US 2015/0224572 A1 Aug. 13, 2015

(51) Int. Cl.
*B22D 19/10* (2006.01)
*B23P 6/04* (2006.01)
(Continued)

(52) U.S. Cl.
CPC .......... *B22D 19/10* (2013.01); *B22D 19/0081* (2013.01); *B22D 19/04* (2013.01); *B22D 23/06* (2013.01);
(Continued)

(58) Field of Classification Search
CPC ..... B22D 19/10; B22D 19/0081; B22D 25/02; B22D 19/04; B22D 23/06; B22D 23/10; C22C 37/04; C22C 33/10; F01D 25/005; B23K 25/005; C21C 1/105; B23P 6/04; B23P 6/045
See application file for complete search history.

(56) References Cited

U.S. PATENT DOCUMENTS 3,908,739 A   9/1975   Cushman
4,068,111 A *  1/1978  Klumpes ............ B23K 25/005
                                            219/137 R

FOREIGN PATENT DOCUMENTS

CN   1030040 A    1/1989
CN   1819892 A    8/2006
(Continued)

OTHER PUBLICATIONS

European Patent Office, Extended European Search Report issued in Application No. 11877517.0 dated Aug. 10, 2015.
(Continued)

*Primary Examiner* — Richard Chang
(74) *Attorney, Agent, or Firm* — Wood Herron & Evans LLP

(57) ABSTRACT

A method of repairing defect in cast iron workpiece, including: machining the workpiece in the area of the defect to remove the defective material and form a chamber opening at a surface of the workpiece; anchoring a receptacle to the workpiece above the chamber (2), the receptacle is provided with an orifice in communication with the chamber; adding molten iron (4) into the receptacle so that it at least part of it flows into the chamber; adding slagging agent (5) into the receptacle; heating the slagging agent and the molten iron with an electrode (6); adding nodulizing agent into the molten iron so as to segregate graphite; and allowing the molten iron and the workpiece to cool down slowly. The above-described technique also has applicability for connecting two cast iron workpieces (11,12) together.

22 Claims, 9 Drawing Sheets

(51) Int. Cl.
*B22D 23/06* (2006.01)
*B22D 23/10* (2006.01)
*C21C 1/10* (2006.01)
*B23K 25/00* (2006.01)
*B22D 19/00* (2006.01)
*B22D 19/04* (2006.01)
*B22D 25/02* (2006.01)
*C22C 33/10* (2006.01)
*C22C 37/04* (2006.01)
*F01D 25/00* (2006.01)

(52) U.S. Cl.
CPC ............... *B22D 23/10* (2013.01); *B22D 25/02* (2013.01); *B23K 25/005* (2013.01); *B23P 6/04* (2013.01); *B23P 6/045* (2013.01); *C21C 1/105* (2013.01); *C22C 33/10* (2013.01); *C22C 37/04* (2013.01); *F01D 25/005* (2013.01)

(56) References Cited

FOREIGN PATENT DOCUMENTS

| CN | 101559485 A | 10/2009 |
| CN | 101664799 A | 3/2010 |
| DE | 4414168 A1 | 10/1995 |
| JP | S5594761 A | 7/1980 |

OTHER PUBLICATIONS

International Searching Authority, International Search Report and Written Opinion issued in corresponding PCT Application No. PCT/CN2011/084063 dated Oct. 4, 2012, 13 pages.

* cited by examiner

METHOD OF REPAIRING DEFECTS IN
CAST IRON WORKPIECES, AND A METHOD
OF CONNECTING CAST IRON
WORKPIECES

FIELD OF INVENTION

The present invention relates generally to a method of repairing defects in cast iron workpieces and a method of connecting cast iron workpieces, as well as to cast iron workpieces being repaired or connected.

BACKGROUND OF THE INVENTION

In the production of cast iron workpieces, i.e. castings from cast iron, and especially relatively large castings, it is very difficult to have a perfect workpiece without further finish welding or repair welding after the casting process. Examples of such large castings include hubs for modern wind turbines, which may weigh more than 10 tons and have a diameter of more than 5 meters and which are usually made of ferrite-based spheroidal graphite cast iron having both good ductility and good fatigue strength. Shrink holes appearing upon removing or cutting the risers or runners are the most frequent defects found in the spheroidal graphite cast iron workpieces. There are many causes of the defects. For example, the cooling down of risers and runners is much quicker than of the bulky workpiece, and thus causes insufficient feeding; and expansion of the sand mould may cause insufficient molten iron therein etc. Further defects include gas porosity and dross etc. All these defects occur particularly in thick-walled workpieces.

The structural requirement for such large castings are usually very critical due to the strong loads they need to withstand, since any small defect in cast iron may reduce the fatigue strength and cause its failure earlier than designed lifespan.

For example, in modern wind industry, many of structural components utilized in wind turbines are thick-walled workpieces, the most detectable defects such as shrink holes and dross often come up unexpectedly, and generally leading to the rejection of these workpieces.

Unfortunately, cast iron is less weldable than cast steel because it contains more carbon than steel, which will enter melting pool and increase carbon content in the melts and produce unwanted carbide during subsequent solidification. The traditional repair welding process for steel is therefore not available to cast iron. Extreme care and special skill are required while welding cast iron workpieces because the welds are prone to crack.

During conventional casting process, the carbon dissolves in the molten iron at high temperature and combines with ferrite at low temperature. Since the molten iron cools down and solidifies slowly in sand mould, there is enough time for stable phase transformation. The product of phase transformation is normally the ferrite or pearlite base distributed with the graphite. However, during a welding process, even though the workpieces can be preheated to high temperature before welding or by use of a heat isolator, it is still difficult to retard the rapid solidification of the melts in melting pool and give enough time for adequate graphite segregation. This results the formation of carbide or martensite and hence reduces the ductility of welds drastically. The size of melting pool is too small to retard the rapid solidification of melts.

Current repair welding is problematic when being applied on cast iron workpieces due to the potential stress caused and potential cracks at the welds. Post-welding heat treatment, which is normally required to relieve stress and improve ductility, is usually unfeasible for large castings such as the above mentioned wind turbine hub. This results in a high cost of cast iron workpieces since a significant percentage of them cannot be used due to casting defects.

SUMMARY OF THE INVENTION

The present invention is, at least partly, to overcome the above disadvantages and drawbacks of the prior art and to provide a method to repair cast iron workpieces satisfactorily.

The above object, together with numerous other objects, advantages, and features, which will become evident from the below description, is accomplished by a solution in accordance with the present invention by a method of repairing a defect in a cast iron workpiece, including: machining the workpiece in the area of the defect to remove the defective material and form a chamber opening at a surface of the workpiece; anchoring a receptacle to the workpiece above the chamber, the receptacle is provided with an orifice in communication with the chamber; adding molten iron into the receptacle so that at least part of it flows into the chamber; adding slagging agent into the receptacle; heating the slagging agent and the molten iron with an electrode; adding nodulizing agent into the molten iron so as to segregate graphite; and allowing the molten iron and the workpiece to cool down slowly.

Generally speaking, cast iron has a high content of carbon and thus has a poor performance for welding since welding may cause white solidification (i.e. $Fe_3C$ instead of ferrite and separate spherical graphite) and embrittlement at the welding area. By using the above method, both the base workpiece and the welded area can have the same microstructure, i.e. ferrite and segregated spherical graphite, and thus have same performance. Micro-defects such as defect at micron level at the welding area can also be eliminated so that fatigue strength of the workpiece can be enhanced.

The above-described technique also has applicability for connecting two cast iron workpieces together. This is a further aspect of the invention, wherein a method of connecting two cast iron workpieces together includes: bringing together the two cast iron workpieces so that adjacent surfaces to be welded define a chamber therebetween and fixing the two cast iron workpieces at a desired position; anchoring a receptacle to at least one of the two cast iron workpieces above the chamber, the receptacle is provided with an orifice to be in communication with the chamber; adding molten iron into the receptacle so that at least part of it flows into the chamber; adding slagging agent into the receptacle; heating the slagging agent and the molten iron with an electrode; adding nodulizing agent into the molten iron so as to segregate graphite; and allowing the molten iron and the workpieces to cool down slowly. In one embodiment, at least one of the two cast iron workpieces is machined at its surface to be welded to define the chamber.

The demands of modern industry require larger and larger cast iron workpieces. For example, in the field of utility-scale wind turbines size of hub castings gets bigger and bigger as megawatts of output of turbine rise, e.g., up to several meters in diameters. Considering the difficulty of having a perfect large casting at one time, it has been considered to split the large casting into several smaller castings and have them connected via bolts and the like. However, stress concentration and high requirements for bolts are another challenge the practitioners need to face.

The above-described technique is applicable to joint two or more cast iron workpieces together.

The cooling may be effected through material heat exchange with the environment, or may be slowed by application of heat in roder to segregate graphite. The above electrode could be used for slowing the cooling rate.

According to one aspect of the invention, the step of adding nodulizing agent into the molten iron may include inserting into the molten iron a feeder tube containing a wire therein.

The nodulizing agent may be magnesium or an alloy of magnesium and rare earth. Alternatively, cerium, tellurium, and ytrium etc. may also be usd. The tube is made of a refractory material, such as $Al_2O_3$, so as to protect the nodulizing agent therein.

According to one embodiment of the invention, the step of adding molten iron includes having a consumable cast iron electrode melted down in the chamber and the cup.

The molten iron preferably has same or similar chemical composition as that of the cast iron workpiece to be repaired/welded. This allows for better performance of the final workpiece.

The process of connecting two cast iron workpieces may include anchoring a bottom plate lined with a refractory layer to the two cast iron workpieces so as to close one side of the space between the two cast iron workpieces, in order to contain the molten iron.

The castings with which the invention is primarily concerned are castings of graphitic cast iron and especially spheroidal cast iron or nodular cast iron.

This invention will benefit foundries or other industrial manufacturers that use large cast iron workpieces. The invention is of particular benefit in the field of utility-scale wind turbines, because certain structural components for wind turbines are made of the ferrite based spheroidal graphite cast iron. One example of the commonly used grade of spheroidal graphite cast iron is EN-GJS-400-18U-LT which exhibits both good ductility and good fatigue strength. For example, the cast iron workpiece to be repaired may be a hub or part of hub for modern wind turbine, and the cast iron workpieces to be welded may be parts of hub for modern wind turbine. By increasing fatigue strength of the hub, design weight of the hub can be lowered down and life of the wind turbine can be prolonged.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE EMBODIMENTS

Repair methods for cast iron workpieces are described herein. In the following description, numerous details are set forth to provide a more thorough explanation of the present invention. It will be apparent, however, to one skilled in the art, that the present invention may be practiced without these specific details.

Figure 1:
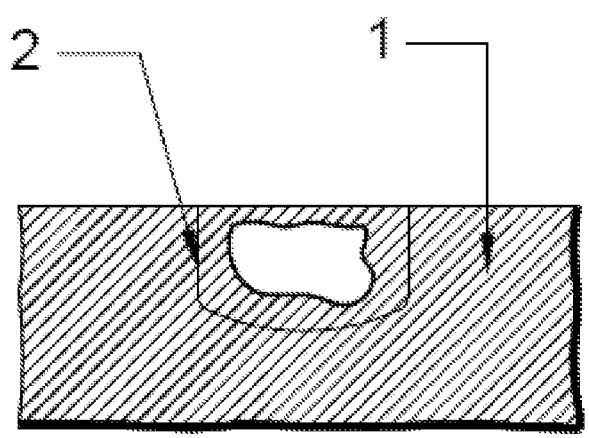
FIG. 1 is a cross sectional view of a defective casting.

FIG. 1 illustrates a base casting 1 with a defect illustrated schematically there. The defect could take a variety of forms such as gas porosity, shrinkage defect, misrun, cold shut, inclusion, etc. There are many non-destructive ways to detect all these kind of defects, such as ultrosonic flaw detection, radiographic testing, magnetic particle testing, penetrant testing or eddy current testing, as is known in the field by people skilled in the art.

Figure 2:
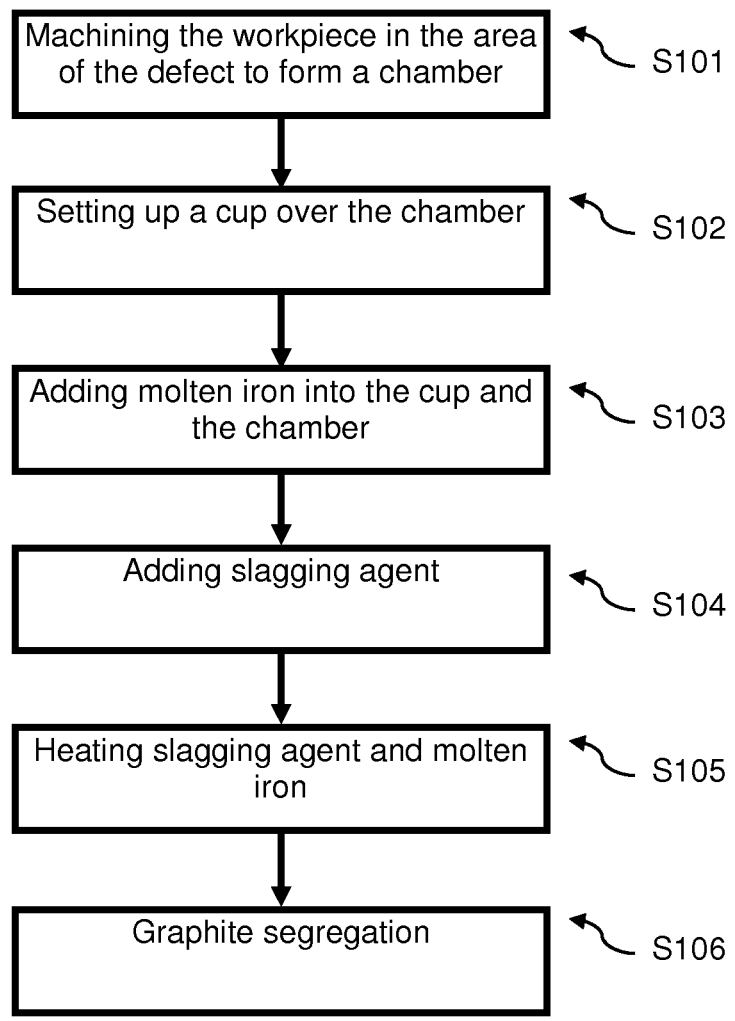
FIG. 2 illustrates a flowchart of repairing a defect on the casting.

After the defect is confirmed and to be repaired, a process illustrated in FIG. 2 will be followed to repair the workpiece.

As indicated in step S101, the workpiece is machined at the location of the defect, such as drilled, to form a chamber 2 open at the surface, as shown in FIG. 1. The defect is removed to such extent that the chamber 2 has a defectless, more or less smooth and rounded-off surface, as is known in the field.

In step S102, a receptacle in the form of a cup 3 is set on the chamber 2 so as to accommodate molten iron 4 (refer to FIG. 4) in the following steps, as shown in FIG. 2. The cup 3 is mainly formed of extremely high-temperature resistant (refractory) material such as crystal graphite and clay, and could be any type of available crucible or its equivalents used in casting field. The cup 3 is provided with an orifice 31 at its bottom to be in communication with the chamber 2. Depending on the orientation and position of the defect on the workpiece, the orifice 31 may also be at other places on the cup 3, such as on its side.

Figure 3:
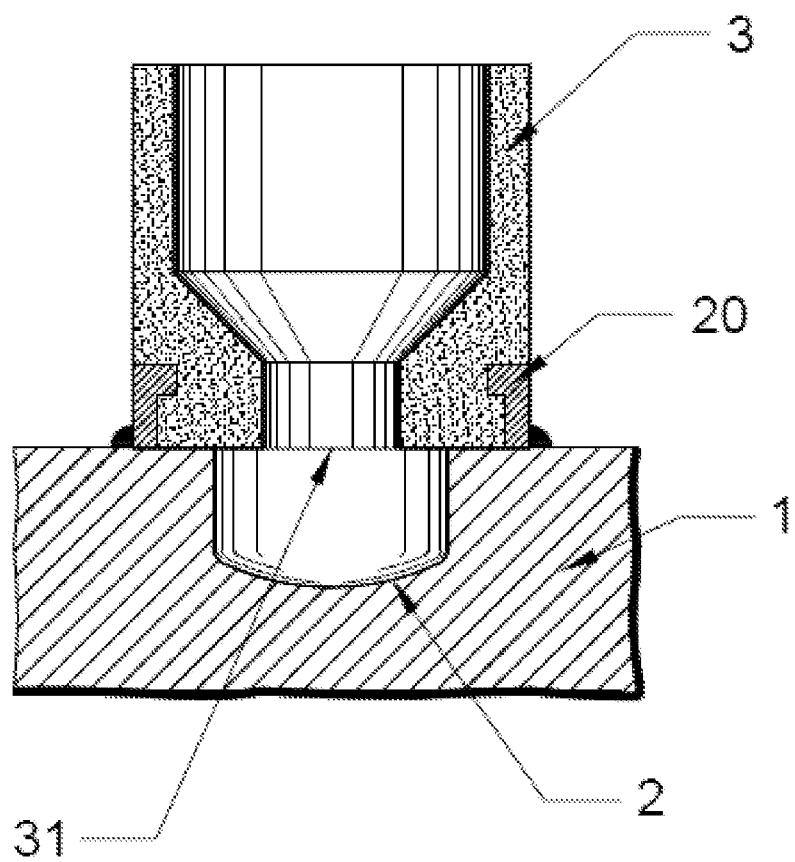
FIG. 3 illustrates setting of a cup at the defect.

The cup 3 may be anchored onto the base casting 1 over the defect via welding etc. Since the cup 3 is mainly made of refractory material such as crystal graphite and clay which are not suitable for directly receiving a welded joint, a special structure therefor is also suggested here. As shown in FIG. 3, provided at the bottom of outer surface of the cup 3 is an "L" sectioned metal collar anchor 20, at least a part of which protrudes into the body of the cup 3 so as to make a rigid connection therewith. A welded joint can then be made between base casting 1 and the metal collar anchor 20, to prevent the cup 3 from movement by the pressure supplied by poured molten iron in the following process. If, however, the cup 3 is made of refractory metal which is suitable for welding, no additional anchor is necessary. Also, the height of the cup 3 is selected such that it is sufficient for accommodating sufficient subsequently added molten iron and slagging agent. The amount of molten iron in the cup 3 should be sufficient for compensating shrinkage upon cooling in the chamber, while depending on the amount of molten iron, size of electrode, voltage applied on the electrode etc, the amount of slagging agent should be sufficient to cover and heat the molten iron.

Figure 4:
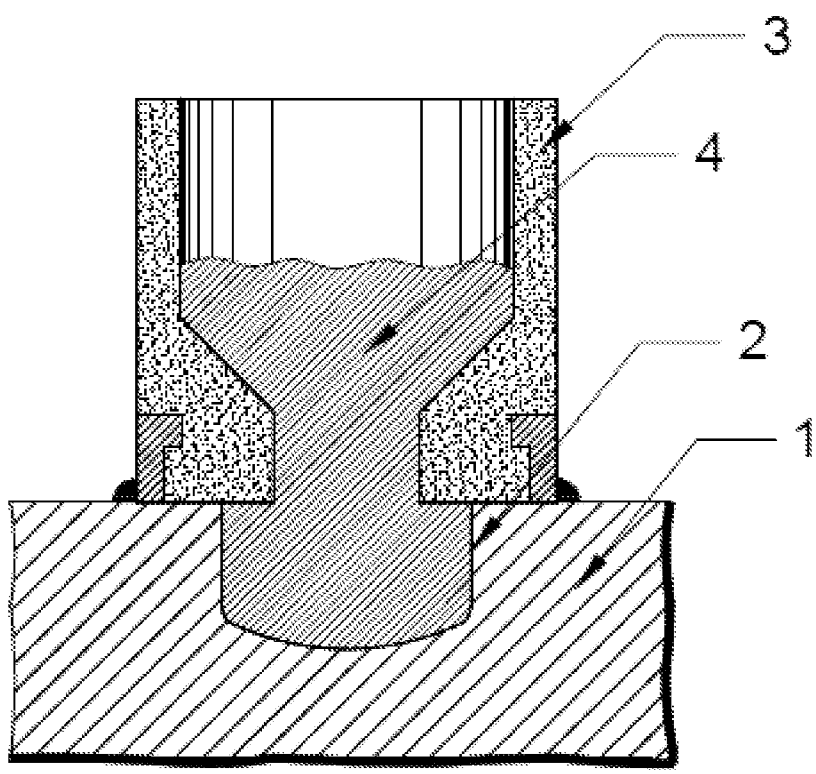
FIG. 4 illustrates adding molten iron into the cup and chamber.

After setting up the cup 3, as indicated in step 103, molten iron 4 is poured into the cup 3 and chamber 2 by hand using ladles, and up to a level extending above the workpiece surface and sufficient for compensating shrinkage upon cooling in the chamber, as shown in FIG. 4. The molten iron 4 may be prepared by using a cupola, induction furnace, or EAF in an iron foundary. The temperature of the molten iron is typically between 1350° C. and 1500° C. Preferrably, the molten iron 4 is of the same or similar chemical composition as that of the casting 1 to be repaired, such that a defect-free, continuous and metallurgically equivalent transition is obtained between the casting 1 and the added material 10 (refer to FIG. 8).

Alternatively, the molten iron 4 may be in the form of a consumable cast iron electrode. The cast iron electrode can then be melted down in the chamber 2 and cup 3 by application of electrical current. Techniques employing either the prepared molten iron 4 or the electrode formed cast iron are both within the scope of present invention.

As indicated in Step 104 of FIG. 2, slagging agent 5 in the form of powder is added into molten iron, followed by step 105, in which both the slagging agent and the molten iron are heated by electrode 6.

Figure 5:
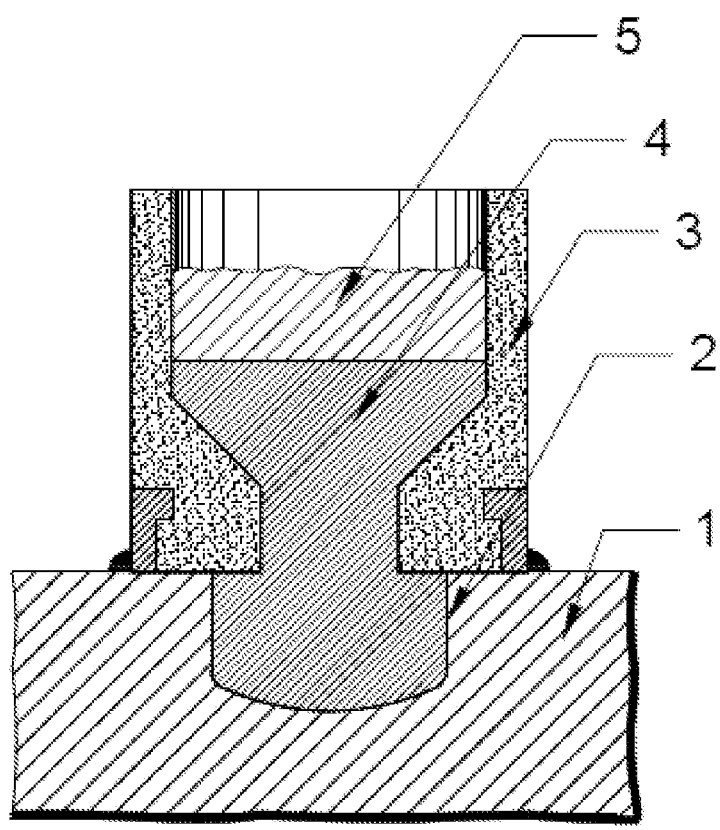
FIG. 5 illustrates the adding slagging agent into the cup.
Figure 6:
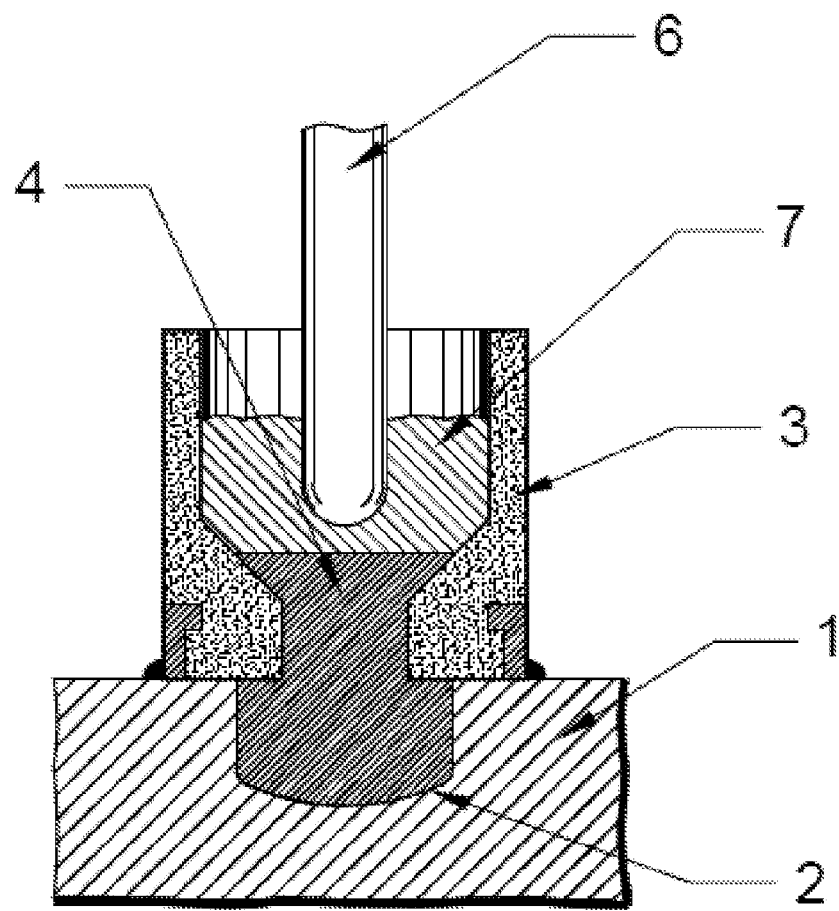
FIG. 6 illustrates heating the slagging agent and the molten iron by an electrode.

FIG. 5 and FIG. 6 schematically illustrate, among others, the slagging process. Slagging is generally used as an impurity removal mechanism in metal smelting, it can also serve other purposes, such as assisting in the temperature control of the smelting; and also minimizing any reoxidation of the molten metal. As shown in FIG. 5, an amount of slagging agent 5 in the form of powder, such as a mixture of CaO and $Al_2O_3$, is added into the cup. The slagging agent 5 may partly reacts with undesired components in the molten iron 4 to remove the impurities. The remaining slagging agent and the produced material are collectively referred to as slag 7.

As shown in FIG. 6, a non-consumable electrode 6 reaches into the slagging agent 5 and initially melts it via arc produced due to the voltage difference between the electrode 6 and the base casting 1. After being partly melted down, the liquid slagging agent 5 becomes conductive and can then be used to heat by electrical current flowing through. By the above-mentioned arc heating and resistance heating, the slag 7 becomes liquid. The slagging agent 5 may also be preheated to molten form at another location such as at a foundry and poured into the molten iron 4. Because the liquid slag 7 has a lower specific weight than the material of the base casting 1, it will remain floating on the molten iron 4, excluding the surrounding atmosphere.

It should be noted that order of adding molten iron 4 and adding slagging agent 5 is not restricted to adding molten iron 4 before slagging agent, rather adding slagging agent before molten iron 4 may also be utilized.

As an alternative, the non-consumable electrode 6 may be hollow with slagging agent contained therein. With this arrangement, the step of adding slagging agent and the heating can be conducted simultaneously.

The molten iron 4 is kept at a temperature above the melting temperature of the material of the base casting 1 for a predetermined time period, until the wall surface in the chamber 2 reaches its melting temperature such that a degree of melting occurs, and the base casting 1 in the vicinity of the chamber 2 is sufficiently heated to an extent that subsequent too rapid cooling of the molten iron can be avoided, for example to around 600° C. The heating takes place within and from the chamber to be filled, from which the heat is transmitted into the base casting 1. The precise time elapsed until the material of the base casting 1 is heated sufficiently depends on different factors, such as the shape and thickness of the workpiece, the used welding current and the voltage, etc.

Figure 7:
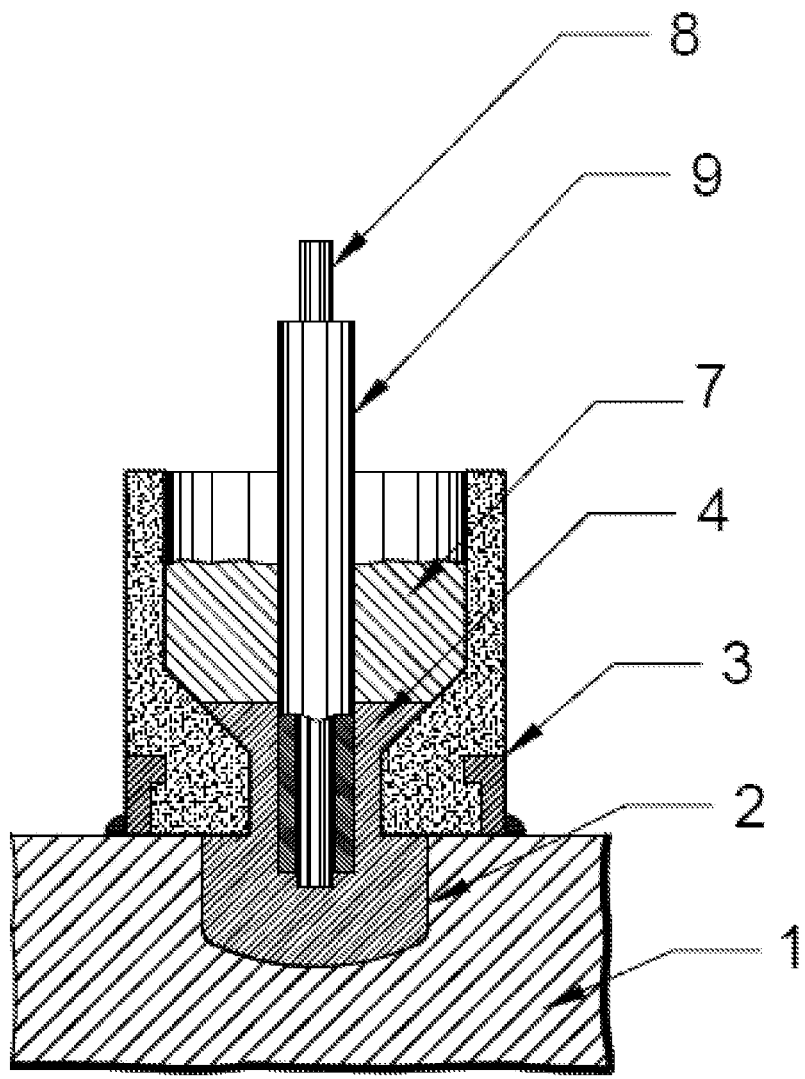
FIG. 7 illustrates the nodulization process.

The process then proceeds to the nodulization process as indicated in step 106. As shown in FIG. 7, after the wall surface in the chamber 2 starts to melt and the base casting 1 in the vicinity of the chamber 2 is sufficiently heated, the non-consumable electrode 6 is quickly replaced by a a feeder tube 9 and a wire 8 that extends through the tube 9.

The tube 9 serves to protect the wire 8 from erosion by the slag 7 before it reaches the melting pool, and could be made of any refractory material, such as $Al_2O_3$. The wire 8 is formed of a kind of nodulizing agent which may be magnesium, or alloy of magnesium and rear earth metal, although cerium, tellurium, and yttrium etc. may also be used. By inserting the feeder tube 9 into the melting pool, the wire 8 in the feeder tube 9 dissolves in the molten iron 4 to effect graphite segregation (i.e. nodulization). In the whole nodulization process, the feeder tube 9 and/or the wire 8 may be manipulated and moved manually or automatically. After the graphite segregation, the feeder tube 9 and remaining wire 8 therein will be removed.

The above describes only one embodiment of how to carry out the graphite segregation process, and there are many other ways to achieve the same purpose. Various other techniques to add nodulizing agent may be used, and are within the scope of present invention. For example, tube 9 is not necessary as long as at least a part of the nodulizing agent is otherwise protected from being eroded by the slag when going therethrough so that the part of the nodulizing agent can assist the graphite segregation.

Since it takes time to effectively segregate graphite, the casting needs to be slowly cooled down. It is preferred to have a low cooling rate such as natural air cooling in the ambient environment or even slower, because a higher cooling rate will cause graphite segregation at low temperature and lead to white solidification and reduced graphite nodule count.

As an exemplary way of achieving a slower cooling rate, the earlier used electrode 6 may be used again. Through natural air cooling and simultaneous application of a certain degree of heat by the electrode 6, an overall effect of slower cooling can be obtained. Heating by the electrode 6 can be controlled by adjusting voltage applied thereon etc.

After the casting is cooled down, it will be machined to remove the cup anchored thereon and any redundant part of the welds to have the final product.

Figure 8:
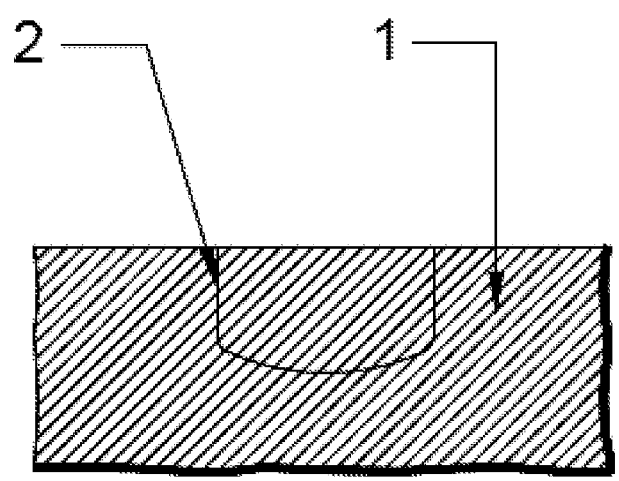
FIG. 8 illustrates the repaired casting.

FIG. 8 shows the repaired casting, the redundant weld part of which has been machined away. As shown, the defect has been filled with material having the same chemical composition as the base casting has, and there is a perfect connection or transition between the base casting 1 and the added material 10.

As discussed, the invention also has the applicability in the effective connection of two or more cast iron workpieces together, this is achieved by utilizing the above discussed technique to form a welded bridging portion.

Figure 9:
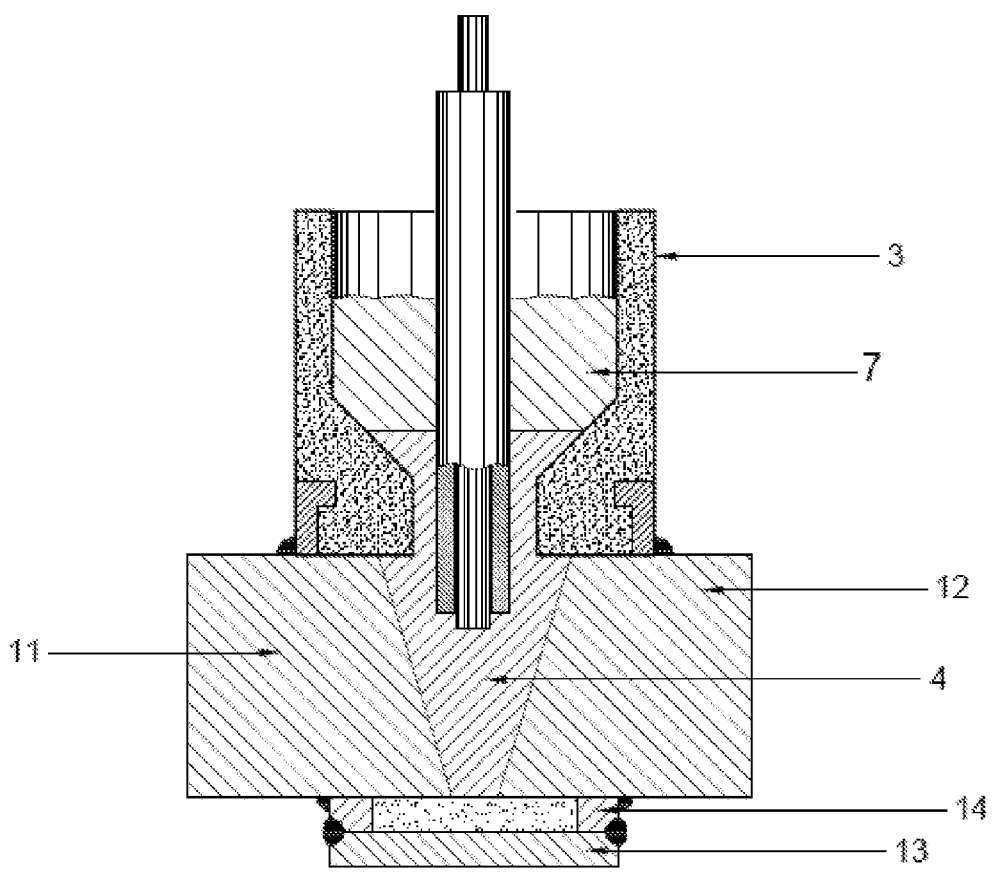
FIG. 9 shows connecting of two cast iron workpieces.

More particularly, as shown in FIG. 9, instead of machining a chamber at a place of defect, two workpieces are brought together in a manner defining a chamber therebetween to receive weld material. This may require that at least one of the two workpieces 11 and 12 is machined to further define a chamber between their to be connected areas. The two workpieces 11 and 12 are brought together and fixed at a desired position according to the required final component. This may be supplemented by additional walls or dams to contain molten material. For example, in the illustrated configuration, to avoid outflow of molten iron, at a lower side, a bottom plate 13 padded with a refractory layer 14 may be anchored to the other surface of workpieces by welding. Additional space can be left between the workpieces 11, 12 and the refractory layer 14 to allow a larger volume of weld material to be used. Various configurations of workpieces and dams or walls to contain molten material may be utilised, as the skilled person will well understand. Other ways may also be used to connect the two workpieces on one side as long as the chamber is closed on at least one side so as to accommodate molten iron and avoid outflow thereof.

For complex connecting areas, such as long and spatially curved connecting areas, a specially made receptacle may be used, or the two workpieces can be jointed at several discrete points at first, and then jointed at the remaining parts.

Subsequent steps remain same as for the above repair process and will not be detailedly repeated. In general, after the two workpieces 11 and 12 are in place, a receptacle in the form of a cup is set on the chamber, followed by adding molten iron into the cup and the chamber. Thereafter, by adding slagging agent into the molten iron and heating the slagging agent and the molten iron through an electrode, slagging process is finished and liquid slag is floating upon the molten iron. Through using a feeder tube or the like, nodulizing agent is added into the molten iron so as to segregate graphite. The workpieces are subject to natural air cooling with ambient environment or even slower cooling to have better segregation, and then are machined to remove any redundant portion, resulting in the final product, where the components are joined by a strong weld joint.

The invention claimed is:

1. A method of repairing a defect in a ductile cast iron workpiece, comprising:
   machining the workpiece in an area of the defect to remove the defect and form a chamber opening at a surface of the workpiece;
   anchoring a receptacle to the workpiece above the chamber, wherein the receptacle is provided with an orifice in communication with the chamber;
   adding molten iron into the receptacle so that at least part of the molten iron flows into the chamber;
   adding a slagging agent into the receptacle;
   heating the slagging agent and the molten iron with an electrode;
   adding a nodulizing agent into the molten iron so as to segregate graphite; and
   allowing the molten iron and the workpiece to cool down slowly.

2. The method according to claim 1, wherein the step of allowing the molten iron and the workpiece to cool down slowly includes allowing the molten iron and the workpiece to cool through natural air cooling by exchanging heat with the ambient environment.

3. The method according to claim 1, wherein the step of allowing the molten iron and the workpiece to cool down slowly includes allowing the molten iron and the workpiece to cool through natural air cooling and simultaneous application of a certain degree of heat.

4. The method according to claim 1, wherein the step of adding the nodulizing agent into the molten iron includes inserting into the molten iron a feeder tube containing a wire therein.

5. The method according to claim 1, wherein the nodulizing agent is magnesium or an alloy of magnesium and rare earth.

6. The method according to claim 1, wherein the step of adding molten iron into the receptacle includes melting a consumable cast iron electrode.

7. The method according to claim 1, wherein the molten iron is of the same chemical composition as that of the cast iron workpiece to be repaired.

8. The method according to claim 1, further including detecting the defect through a non-destructive technique.

9. The method according to claim 1, further including removing the receptacle and a redundant part from the workpiece after cooling down.

10. The method according to claim 1, wherein the cast iron workpiece is formed from spheroidal graphite cast iron.

11. The method according to claim 1, wherein the cast iron workpiece is a hub for a wind turbine.

12. A method of connecting two ductile cast iron workpieces together, comprising:
    bringing together the two cast iron workpieces so that adjacent surfaces to be welded define a chamber therebetween and fixing the two cast iron workpieces at a desired position;
    anchoring a receptacle to at least one of the two cast iron workpieces above the chamber, wherein the receptacle is provided with an orifice in communication with the chamber;
    adding molten iron into the receptacle so that at least part of the molten iron flows into the chamber;
    adding a slagging agent into the receptacle;
    heating the slagging agent and the molten iron with an electrode;
    adding a nodulizing agent into the molten iron so as to segregate graphite; and
    allowing the molten iron and the two workpieces to cool down slowly.

13. The method according to claim 12, wherein the step of allowing the molten iron and the two workpieces to cool down slowly includes allowing the molten iron and the two workpieces to cool through natural air cooling by exchanging heat with the ambient environment.

14. The method according to claim 12, wherein the step of allowing the molten iron and the two workpieces to cool down slowly includes allowing the molten iron and the two workpieces to cool through natural air cooling and simultaneous application of a certain degree of heat.

15. The method according to claim 12, wherein the step of adding the nodulizing agent into the molten iron includes inserting into the molten iron a feeder tube containing a wire therein.

16. The method according to claim 12, wherein the nodulizing agent is magnesium or an alloy of magnesium and rare earth.

17. The method according to claim 12, wherein the step of adding molten iron into the receptacle includes melting a consumable cast iron electrode.

18. The method according to claim 12, wherein the molten iron is of the same chemical composition as that of the cast iron workpieces to be connected.

19. The method according to claim 12, wherein at least one of the two cast iron workpieces is machined to define the chamber.

20. The method according to claim 12, further including removing the receptacle and a redundant weld portion from the workpieces after cooling down.

21. The method according to claim 12, wherein the two cast iron workpieces are parts of a hub for a wind turbine.

22. The method according to claim 12, wherein the step of fixing the two cast iron workpieces at a desired position includes anchoring a bottom plate padded with a refractory layer to the two cast iron workpieces so as to close at least one side of a space between the two cast iron workpieces.

* * * * *